April 14, 1936. G. E. MURPHY ET AL 2,037,259
WOOD FLOORING
Original Filed April 21, 1932  2 Sheets-Sheet 1

INVENTORS.
George E. Murphy,
Walter M. Hippler.
BY
ATTORNEYS.

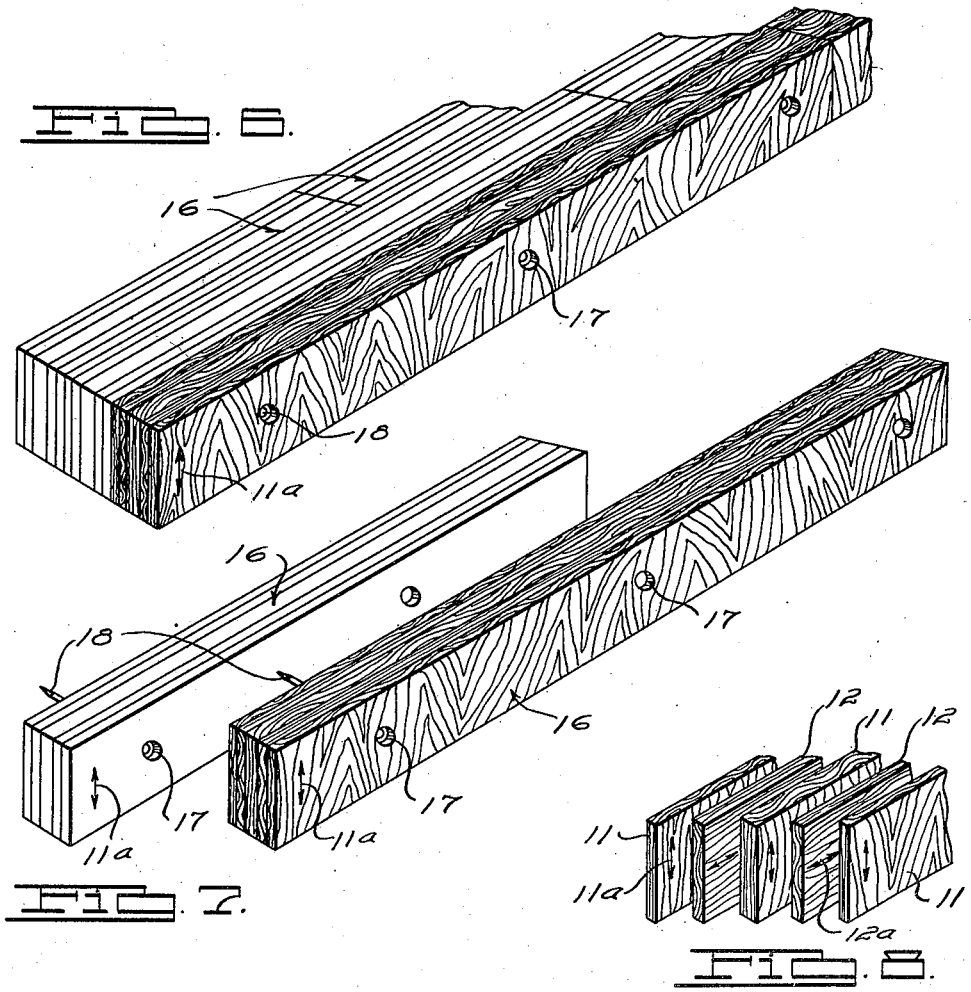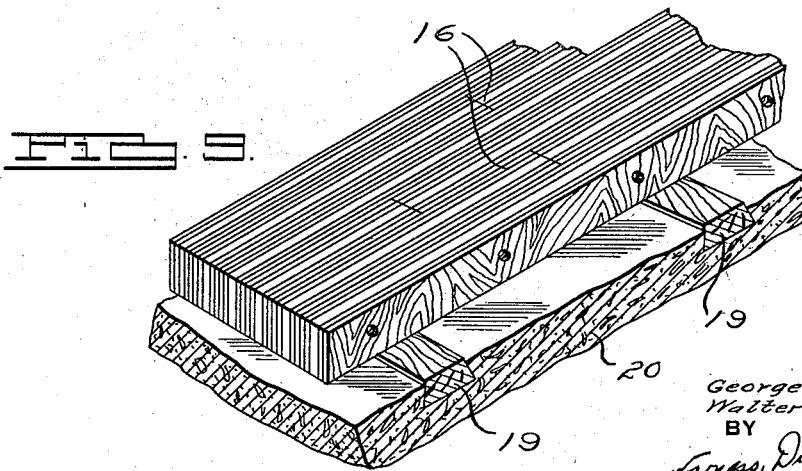

Patented Apr. 14, 1936

2,037,259

UNITED STATES PATENT OFFICE 2,037,259

WOOD FLOORING

George E. Murphy and Walter M. Hippler, Portland, Oreg., assignors, by mesne assignments, to Evans Products Company, Detroit, Mich., a corporation of Delaware Application April 21, 1932, Serial No. 606,566
Renewed September 9, 1935

5 Claims. (Cl. 20—75)

Our invention relates to wood flooring and more particularly to laminated wood flooring composed of a plurality of layers of wood.

The principal object of our invention is to provide a wood flooring of laminated strips of wood which combine great wearing qualities and unusual strength against bending and breaking stresses. We combine certain known qualities inherent in the wood to effect this result in a new and novel manner not used heretofore.

Generally our invention consists in the use of a plurality of relatively thin layers of wood joined together, alternately placing side by side a layer of end grain wood, that is with the grain running vertically, and a layer of side grain wood, that is with the grain running horizontally. The end grain layers, present the end of the grain for maximum wearing qualities and the side grain layers strengthen the laminated strip against bending and breaking when subjected to great weight, and uneven distribution of weight.

Figure 1:
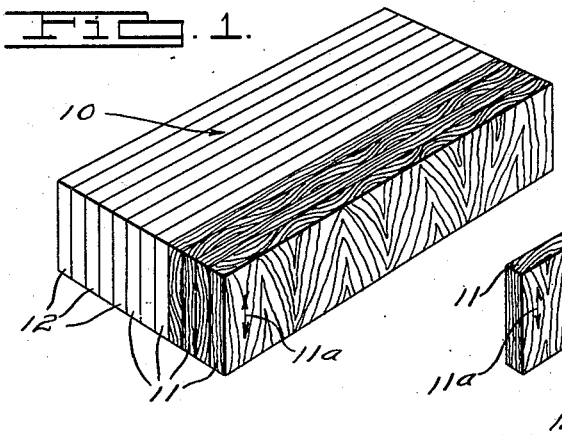
Figure 2:
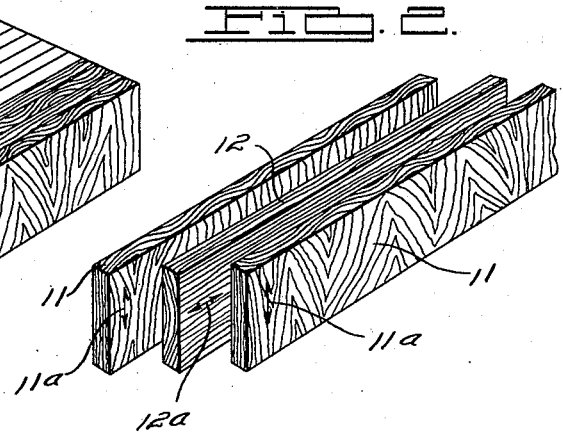
Figure 3:
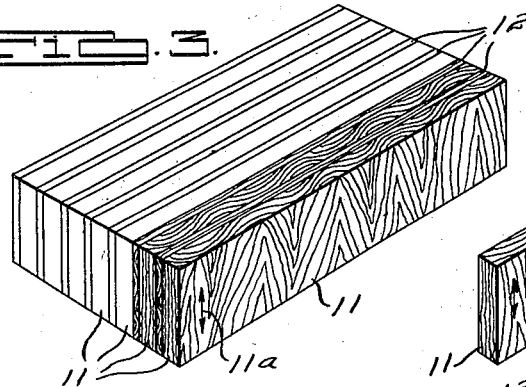
Figure 4:
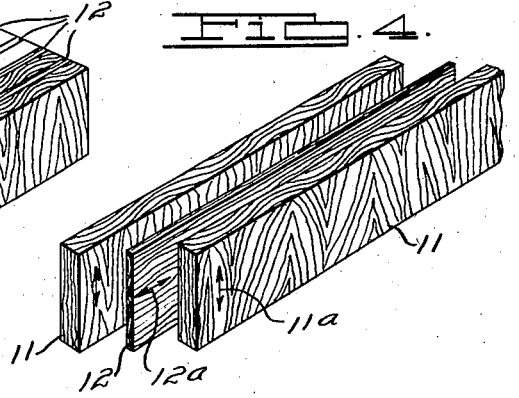
Figure 5:
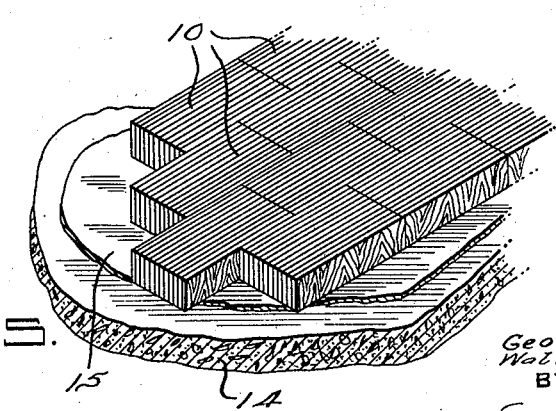

Numerous objects and advantages of our construction will readily become apparent throughout a reading of the following detailed description and accompanying drawings, in which:

Figure 1 is a perspective view of a laminated wood block constructed in accordance with our invention, Fig. 2 is an enlarged detailed exploded view of a portion of the block of Fig. 1 illustrating the alternate disposition of the grain in the adjacent strips, Fig. 3 is a perspective view of a modified form of our invention, Fig. 4 is an enlarged detailed exploded view of a portion of the block of Fig. 3, Fig. 5 is a section of flooring composed of blocks embodying our invention and applied to a concrete base with an adhesive, Fig. 6 is a perspective view of a section of laminated built-up strip flooring embodying our invention, Fig. 7 is a detailed perspective view of two of the laminated strips which are joined together to form the built-up floor shown in Fig. 6, Fig. 8 is an enlarged detailed exploded view of one of the strips of Fig. 7, and Fig. 9 illustrates a section of the built-up strip floor laid on sleepers imbedded in concrete.

Referring now to the drawings in detail in which like reference characters indicate like parts throughout the several views, the block 10 shown in Fig. 1 is composed of alternate and adjacent layers of end grain wood 11 and side grain wood 12, joined together by glue or other adhesive or in any other desirable manner. As best shown in Fig. 2 the layers 11 are relatively thin strips of grain on end, wood, that is the wood is cut so that the grain will run vertically when positioned in the block, the arrow 11-a indicates the direction of the grain. The layers 12 are relatively thin strips of side grain wood, that is, wood cut so that the grain runs longitudinally and horizontally of the strip when positioned in the block. The arrow 12-a indicates the direction in which the grain runs.

The composite block thus formed is of great wearing qualities on its upper or tread surface because of the end grain layers of wood, the end grain strips however do not possess the structural strength for load carrying particularly across a span. The side grain layers of wood possess excellent structural strength qualities against breakage and bending strains and stresses particularly across a span. Unevenness in the surface of the subfloor on which the blocks are laid will often cause the block to rest on the floor near its ends spanning a low spot at the center of the block and it is in such conditions that the structural strength to support the load is needed.

The advantages of this combined side and end grain laminated construction is even more apparent in the built up strip flooring shown in Figs. 6, 7, 8 and 9 which is laid across sleepers or beams and spans the distance between these supports.

In Figs. 3 and 4 we have shown a modified form of our invention in which the laminated wood block 10 is composed of adjacent and alternate layers of end grain strips 11 and side grain strips 12 which differ from the first described form in that the end grain strips 11 are wider than the side grain strips 12 and are preferably a multiple of their width. In the form illustrated in the drawings the end grain layers 11 are three times the width of the side grain layers 12.

The utility of this construction lies in the fact that in some instances and under some conditions the side grain strip which is a fraction of the width of the end grain strip will be sufficient to provide the required structural strength against breakage and bending strains. Tests have shown the required proportion to vary under various conditions. In the form shown in Figs. 3 and 4 an end grain wearing surface is provided which is three times the side grain area, resulting in an unusually high wear resisting factor.

It is contemplated that if the condition requires the side grain layers 12 may be provided wider than the end grain layers 11 thus increasing the structural load carrying strength and decreasing the wear resisting factor in the proportion that the exposed tread area of side grain wood bears to the exposed tread area of the end grain wood.

As shown in Fig. 5 these wood blocks may be applied to a concrete subfloor 14 with a mastic or other adhesive 15 in any well known manner either by dipping the blocks in the mastic or troweling the mastic on the floor.

The built-up strip flooring illustrated in Figs. 6 to 9 inclusive, is constructed by forming elongated strip 16 of laminated wood made up of alternate adjacent layers of end grain wood 11 and side grain wood 12 joined together by adhesive or in some other suitable manner in accordance with our invention as hereinbefore described. These strips 16 are then joined to each other in some suitable manner. One method is shown in the drawings and consists in drilling countersunk holes 17 transversely through the strips and joining them together by nails 18 or other fastening devices.

The proportions of the area of side grain wood and area of end grain wood to be presented to the wearing tread surface may be varied in accordance with the prevailing requirements, that is some of the end grain layers 11 may be wider than the side grain layers 12.

The great structural strength and load bearing qualities of side grain is thus combined with the excellent wearing qualities of end grain to form a floor of great strength and durability.

These built-up strip floors readily lend themselves for application to sleepers or cross support beams. As shown in Fig. 9 the strips 16 may be laid over beams or sleepers 19 which may be imbedded in concrete 20 if desired. It is apparent that the great strain of load bearing required because of the span between the sleepers or beams 19 requires a strip of unusual structural strength. Extensive tests have shown that a floor constructed in accordance with our invention possesses such structural strength in addition to the wear resisting qualities of end grain wood.

Formal changes may be made in the specific embodiment of the invention described without departing from the spirit and substance of the broad invention, the scope of which is commensurate with the appended claims.

We claim:

1. A laminated wood unit adapted for use in constructing flooring comprising a plurality of strips of wood of uniform length and width and disposed on edge to extend in the same direction with their upper edges forming the tread surface of the unit, some of said strips having vertically extending grain to produce a hard wear resisting tread, the remaining strips having horizontally extending grain to increase the strength of the unit, and means for fastening the strips together.

2. A laminated wood unit adapted for use in constructing flooring comprising a plurality of strips of wood of uniform length and width and disposed on edge to extend in the same direction with their upper edges forming the tread surface of the unit, some of said strips having vertically extending grain to produce a hard wear resisting tread, the remaining strips being of different thickness than and alternately arranged with respect to the first-mentioned strips and having horizontally extending grain to increase the strength of the unit, and means for fastening the strips together.

3. A laminated wood floor comprising a plurality of units, each unit comprising a plurality of strips of wood of uniform length and width and disposed on edge to extend in the same direction with their upper edges forming the tread surface of the unit, some of said strips having vertically extending grain to produce a hard wear resisting tread, the remaining strips having horizontally extending grain to increase the strength of the unit, and means for fastening the strips together, said units being laid to form the floor with the strips of all of the units extending in the same direction.

4. A laminated wood unit adapted for use in constructing flooring comprising a plurality of strips of wood of uniform length and width and disposed on edge to extend in the same direction with their upper edges forming the tread surface of the unit, some of said strips having vertically extending grain to produce a hard wear resisting layer, the remaining strips being thinner than the first mentioned strips and having horizontally extending grain to increase the strength of the unit, and means for fastening the strips together.

5. A laminated wood unit adapted for use in constructing flooring comprising a plurality of strips of wood of uniform length and width and disposed on edge to extend in the same direction with their upper edges forming the tread surface of the unit, some of said strips having vertically extending grain to produce a hard wear resisting layer, the remaining strips being thicker than the first mentioned strips and having horizontally extending grain to increase the strength of the unit, and means for fastening the strips together.

GEORGE E. MURPHY.
WALTER M. HIPPLER.